(12) United States Patent
Florence

(10) Patent No.: US 6,995,738 B2
(45) Date of Patent: Feb. 7, 2006

(54) TWO-PANEL REFLECTIVE LIQUID CRYSTAL DISPLAY PROJECTION SYSTEM AND METHOD OF USING THE SAME

(75) Inventor: James M. Florence, Dallas, TX (US)

(73) Assignee: Sharp Laboratories of America, Inc., Camas, WA (US)

(*) Notice: Subject to any disclaimer, the term of this patent is extended or adjusted under 35 U.S.C. 154(b) by 405 days.

(21) Appl. No.: 10/022,768

(22) Filed: Dec. 13, 2001

(65) Prior Publication Data

US 2003/0117357 A1  Jun. 26, 2003

(51) Int. Cl.
G09G 3/36 (2006.01)

(52) U.S. Cl. .............................. 345/88; 349/8; 353/34

(58) Field of Classification Search ............... 353/31, 353/34; 349/5, 6, 7, 8, 9, 10; 345/88

See application file for complete search history.

(56) References Cited

U.S. PATENT DOCUMENTS

| 5,629,743 A | 5/1997 | Lee |
| 5,863,125 A | 1/1999 | Doany |
| 5,921,650 A | 7/1999 | Doany |
| 6,650,377 B2 * | 11/2003 | Robinson et al. ............... 349/8 |
| 6,672,722 B2 * | 1/2004 | O'Connor et al. ............ 353/34 |
| 6,771,233 B1 * | 8/2004 | Kim ............................ 345/32 |

* cited by examiner

*Primary Examiner*—Kent Chang
(74) *Attorney, Agent, or Firm*—David C. Ripma

(57) ABSTRACT

A system provides a two-panel projection system wherein both display devices run a sequence of red, green, and blue color fields with the sequences staggered so that two different color images are projected at any given time. Each panel shows a color field for two thirds of a frame time while the combination of colors displayed changes every one third of a frame time. With two separate red-green-blue sequences being projected, the display will be twice as bright as a single panel system and the presence of two different color fields at any give time will reduce the visibility of any color splitting artifacts.

22 Claims, 2 Drawing Sheets

TWO-PANEL REFLECTIVE LIQUID CRYSTAL DISPLAY PROJECTION SYSTEM AND METHOD OF USING THE SAME

FIELD OF THE INVENTION

This invention relates to a two-panel reflective liquid crystal display projection system and, more particularly, to a system wherein two liquid crystal display panels simultaneously run a staggered sequence of red, green and blue color images so that two colors are projected at any given time, and wherein a reduced number of fields are projected during each frame so that slow liquid crystal display devices may be utilized.

BACKGROUND OF THE INVENTION

A liquid crystal projector generally utilizes a liquid crystal display (LCD) panel in which modulation is controlled according to an applied voltage to display an image on a screen. Liquid crystal projectors have been utilized with one, two and three LCD panels.

Color field sequential projection systems using a single reflective display panel have two primary limitations: lower lumen output because only one color band of light is projected at any given time; and, color splitting artifacts that occur during times when the viewer's eye is shifting to different parts of the displayed image or while the viewer's eye is tracking motion in the display.

Brightness has been increased by adding a second display device to the system to display one color, typically red, which is always on and by sequencing the remaining two colors, typically blue and green. This two-panel system increases the brightness by approximately fifty percent and provides more red light on the screen for color balancing when red deficient lamps are used in the illumination system. The addition of a second color on the screen also helps the color splitting artifacts due to the eye's less sensitive response to the secondary color combinations, such as yellows, magentas and cyans, rather than the saturated primary colors, i.e., reds, greens and blues.

Color splitting artifacts have been reduced by increasing the number of color fields projected during a single frame. For example, projecting six fields (red, green, blue, red, green, and blue) in a single frame rather than just three fields, causes the artifacts to be smaller and therefor less noticeable. However, most reflective LCD devices are not fast enough to increase the number of fields to six per frame so this technique is not possible for slower devices, i.e., devices only capable if projecting five or less fields per frame.

In another two-panel embodiment, such as described in U.S. Pat. Nos. 5,863,125 and 5,921,650, two-panels are utilized with a colorwheel that sequences different color band polarizations to a polarized light beam splitter (PBS) cube that sends a particular waveband to one or the other panel. However, the brightness of the device is limited because the device does not send two different wavebands simultaneously to each of the LCD panels but instead uses one LCD panel at a time to allow for "dead time" of the other LCD panel. Thus, each LCD displays a separate sequence of red, green and blue (RGB) images, but only one color image is present on the screen at any given time.

In yet another two-panel embodiment, such as described in U.S. Pat. No. 5,629,743, two-panels are utilized to provide a luminance signal and a color signal, wherein a processor uses the signals to conduct mathematical manipulation to produce a second luminance signal and a second color signal. Accordingly, the system is complicated and does not provide a good method of physically implementing a projector for reflective display devices.

Systems utilizing three LCD panels include a single panel for each color component. Thus, the brightness of the image is slightly increased. However, due to the higher number of components, the structure is complicated and expensive to manufacture and maintain.

SUMMARY OF THE INVENTION

The method of the present invention provides a two-panel projection system wherein both LCD display devices run a sequence of red, green, and blue color fields with the sequences staggered so that two different color images are always projected at any given time. The technique also slows down the required response time of the LCD displays so that slower responding LCD devices can be used, i.e., devices capable of projecting five or less fields per frame, and in particular, three fields per frame. With two separate red-green-blue sequences being projected, the display will be twice as bright as a single panel system and the presence of two different color fields at any give time will reduce the visibility of any color splitting artifacts. Moreover, the device is relatively simple and inexpensive to manufacture and maintain.

Accordingly, an object of the invention is to provide a two-panel projection system wherein a sequence of multi-color fields are simultaneously run, in a staggered arrangement, on each panel.

Another object of the invention is to provide a two-panel projection system wherein two different color images are always projected at any given time.

A further object of the invention is to provide a two-panel projection system wherein less than six color fields are projected per frame on each panel.

Still another object of the invention is to provide a two-panel system having improved brightness.

Another object of the invention is to provide a two-panel system having reduced visibility of color splitting artifacts.

A further object of the invention is to provide a two-panel system that is relatively simple and inexpensive to manufacture and maintain.

These and other objects and advantages of the invention will become more fully apparent as the description that follows is read in conjunction with the drawings.

DETAILED DESCRIPTION OF THE PREFERRED EMBODIMENTS

Figure 1:
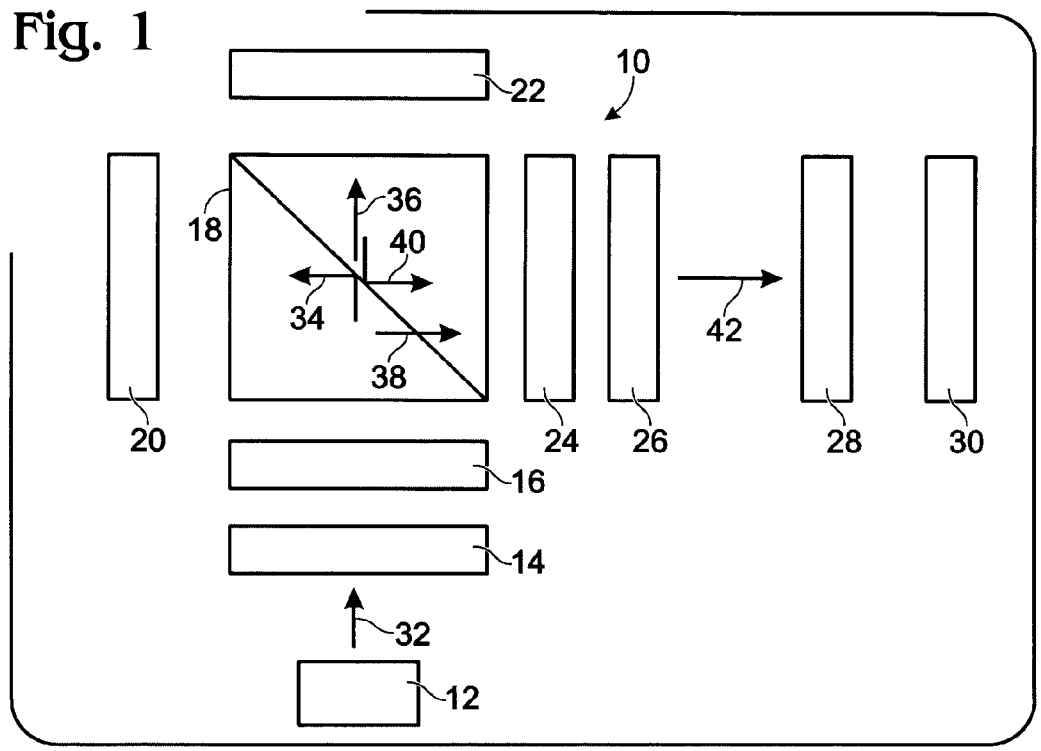
FIG. 1 is a schematic of the two-panel system according to the present invention.

Turning now to the drawings, FIG. 1 shows a schematic of the two-panel system 10 according to the present invention. System 10 comprises a light source 12 (in the embodiment shown the light source provides an S-polarized light, though other polarizations may be provided), a polarizer 14, a color switch 16, a polarized light beam splitter (PBS) prism 18, a reflective liquid crystal display panel 20, a reflective liquid crystal display panel 22, a color switch 24, an analyzer 26, a projection system 28 and a screen 30. Prism 18 is shown as a cube having a selectively reflective surface at a forty five degree angle. However, those skilled in the art will understand that any shape of the beam splitter or angle of the internal surface may be utilized for a particular application.

In a preferred operation of the system, for example, S-polarized light 32 from light source 12 passes through the clean up S-oriented polarizer 14. The light then passes through color switch 16, which preferably is purchased from ColorLink (registered Trademark). Color switch 16 may rotate the polarization of any color band of light, or any combination of color bands to the P-orientated state, or the switch may allow the light to pass there through unrotated. Light 34 that passes through color switch 16 unrotated, i.e., still S-polarized, will be directed to panel 20, also referred to as the first LCD panel, by the reflective internal surface of prism 18. Light 36 that is rotated to the P-state will pass through PBS prism 18 to panel 22, also referred to as the second LCD panel. After modulation by the two display devices, light 38 from panel 20 and light 40 (which is reflected by the internal surface of prism 18) from panel 22 will exit prism 18. Light 38 and 40 exiting the prism will pass through color switch 24 and P-oriented analyzer 26. Color switch 24 is used to align the polarization of only the desired two color bands of light 42 to the P-state for ultimate transmission through lens system 28 and to screen 30.

Figure 2:
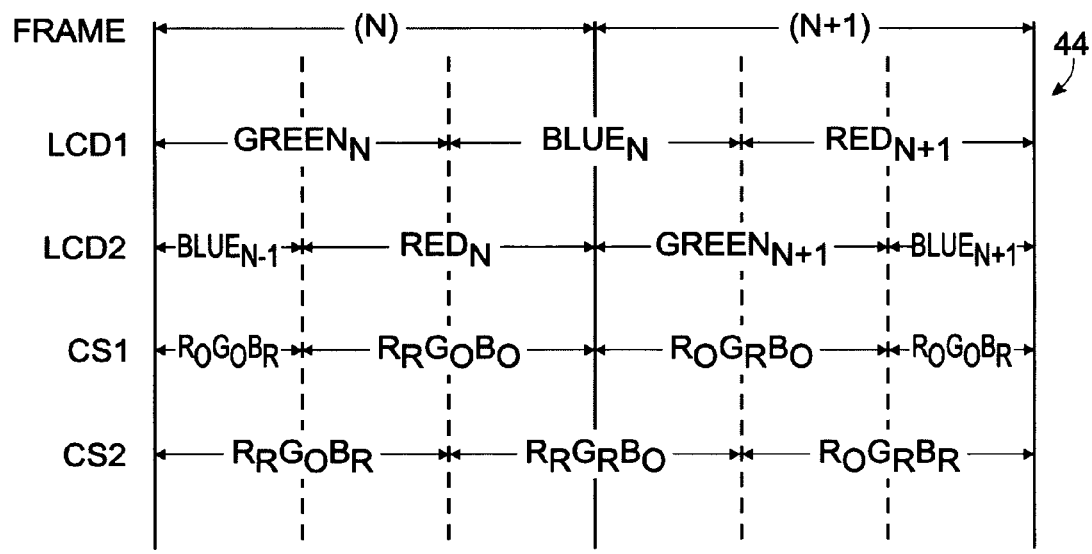
FIG. 2 shows the sequence of image display information and color switch operation for the preferred image sequence of the system.

FIG. 2 shows a graph 44 of the sequence of image display information and color switch operation for the preferred image sequence of the system. In particular, for frames N and N+1, graph 44 shows the sequence of image display information for LCD panel 20 (LCD1) and LCD panel 22 (LCD2), and the color switch operation for the preferred image sequence of color switch 16 (CS1) and color switch 24 (CS2). The sequence shown for the consecutive N and N+1 frames will repeat itself for further display frames. Each of the N and N+1 frames are broken down into three sub-frames, or fields, separated by vertical dash lines. In this sequence three fields per frame are shown for each of the two LCD panels.

At the beginning of the Nth frame, LCD1 is displaying a green image. This data is held for two thirds of the frame time, i.e., the first two fields of frame N, and then the data is switched to a blue image for the remainder of the Nth frame. The blue image is held for two thirds of a frame time resulting in the blue image data remaining on through the first third of the N+1 frame. The data then changes to a red image for the N+1 frame and is held for the last two thirds of frame N+1. This pattern of LCD1 then repeats itself for future frames.

Still referring to FIG. 2, the image data sequence displayed on LCD2 starts with a blue image from the N−1 frame (not shown) and this image is displayed for the first one third of the Nth frame. The data then changes to a red image for the remainder of the Nth frame, i.e., the last two thirds of the Nth frame. The data is then changed to a green image for the N+1 frame, staying on for two thirds of the frame time. Finally, the data is changed to a blue image for the remainder of the N+1 frame, and stays on for two thirds of a frame time, i.e., through the first third of the N+2 frame (not shown). This pattern of LCD2 then repeats itself for future frames.

Accordingly, each LCD panel shows a separate, staggered red, green and blue sequence of image data so that there are two different color images displayed at any given time on screen 30. Each device displays a color field for two thirds of a frame time, thereby reducing the response time requirement of the liquid crystal material, while the combination of colors being displayed changes every one third of a frame time. In one embodiment, the frame time is $\frac{1}{30}^{th}$ of a second, though any frame time may be utilized as is desired for a particular application. For example, if the full frame is set at 60 Hz, then each color band must be operated to change at 90 Hz, i.e., every $\frac{2}{3}$rds of a frame time.

As previously mentioned, the color switches either rotate the polarization of light in a color band or pass the light unrotated, depending on the setting of the control cell in the color switch for each color. The sequence of control settings for CS1 and CS2 to properly display the image data being sent to the display devices is shown in the lower half of graph 44 of FIG. 2.

The color bands are indicated as the upper case letters "R" for red, "G" for green, and "B" for blue. The subscript "R" on each color band designator indicates that the color is being rotated, while the subscript "O" indicates no rotation of the color band. As an example of how the sequence operates, consider the first one third of the Nth frame: it is desired to project to the screen a green image from LCD1 and a blue image from LCD2. Accordingly, CS1 is set to do no rotation of both red and green light, while it will rotate blue light to the P-state. S-polarized red and green light fall on LCD1 and will be modulated to the P-state by the green image data. The blue light falling on LCD2 will be modulated to the S-state by the blue image data. The P-oriented red and green light will pass through PBS prism 18 and onto CS2. The S-oriented blue light reflects from the PBS prism and is also incident on CS2. CS2 is set to rotate red light from the incident P-state to the S-state; CS2 will leave the green light in the P-state and will rotate the blue light from its incident S-state to the P-oriented state. Thus, only green and blue light are in the P-state and will pass through P-oriented analyzer 26. The red light incident on analyzer 26 has been rotated by CS2 to be S-oriented and will be blocked by the analyzer.

Still referring to FIG. 2, the remaining combination of control settings for the color switches are set to always allow only the two desired colors of light through the analyzer and onto projection screen 30. In the embodiment shown, the third color band is always directed to LCD1, but after modulation to the P-state and passing through the PBS prism, CS2 will rotate the third color band to the S-state and it will be blocked by the analyzer. The resulting image on the screen has twice the brightness of a single panel field sequential projector due to the combination of two red-green-blue image sequences. Artifacts will also be reduced by the constant superposition of two different color band images. In other embodiments, the third, non-viewed color band may be directed to LCD2, or may be directed alternately to LCD1 and LCD2, as set by the control settings of the color switches.

Figure 3:
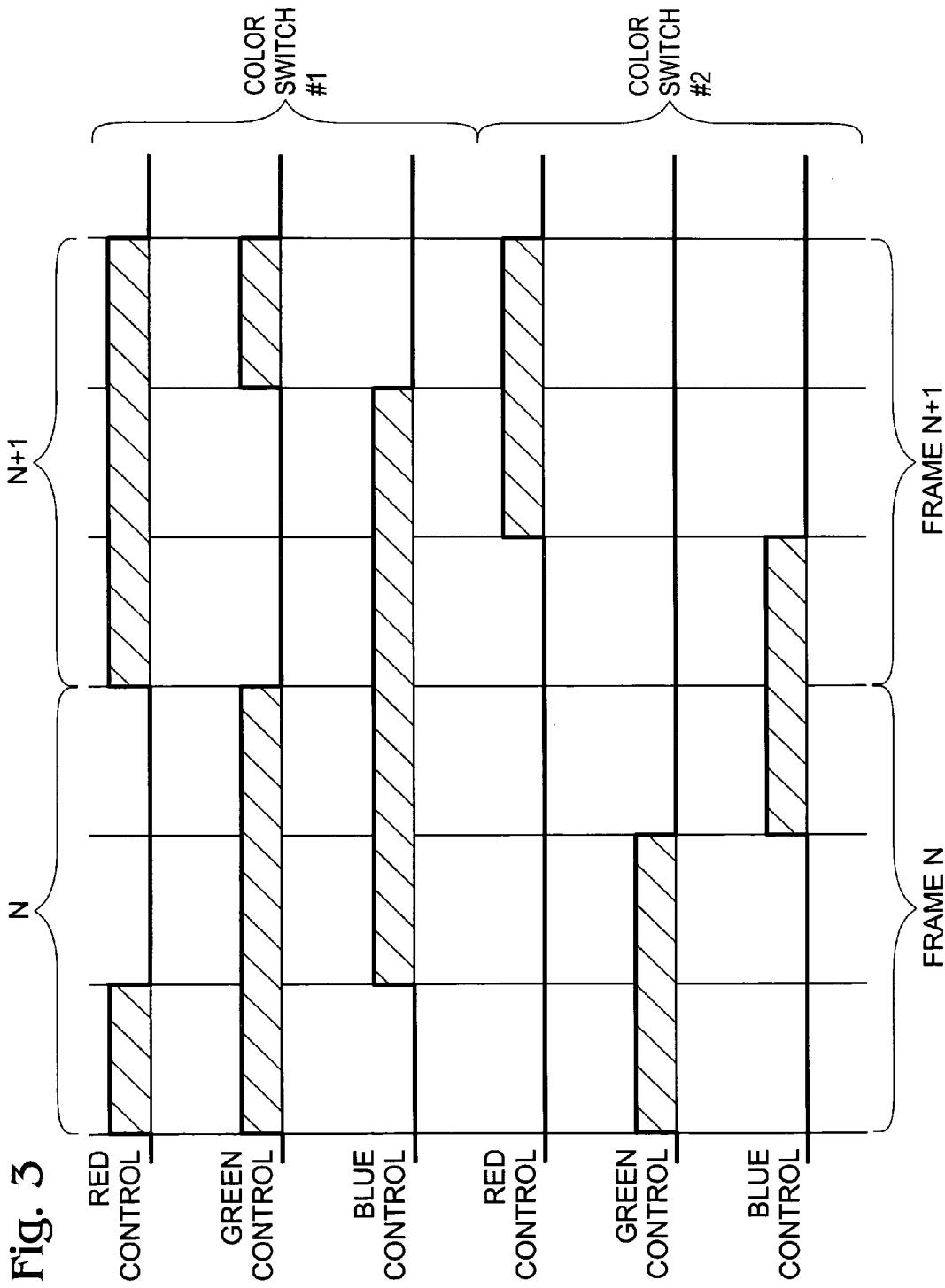
FIG. 3 shows the drive sequence for voltages applied to the control cells of the color switches to affect the projection sequence shown in FIG. 2.

FIG. 3 shows the drive sequence for voltages applied to the control cells of the color switches to affect the projection sequence shown in FIG. 2. In particular, the color switches typically are manufactured to rotate the polarization of any given waveband when the control cell for that waveband is not activated, i.e., in an "off" position. When voltage is applied to the control cell activating the cell, i.e., when the control cell is in the "on" position, the polarization for that waveband will pass through the switch unaffected. Activating the cell by applying the control voltage results in a rapid transition from rotating to non-rotating. The transition response time is approximately ten to twenty microseconds (10 to 20 μsec). The switch back to a rotating state is accomplished by removing the voltage and letting the liquid crystal material in the control cells relax to their original state. These relaxation times are longer than the driven response time when activating the cell. Typical relaxation times for ColorLink (registered Trademark) color switches are approximately 250 μsec for red, 140 μsec for green, and 270 μsec for blue. These transition times are indicated in the drive voltage sequences of FIG. 3 by the slight ramp at the deactivation points. The voltage is removed instantly, but the ramp indicates that the liquid crystal material has a relaxation time.

As stated earlier, it is possible to change the control sequences on the color switches to have the third, non-projected color band always fall on LCD2, or alternately on LCD1 and then on LCD2, rather than just on LCD1. At the present time, however, it appears that having the non-projected third color band always fall on LCD1 gives the best contrast performance in the projected image.

Thus, a two-panel projection system, and method of operating the same, has been disclosed. Although preferred structure and methods of operating the device have been disclosed, it should be appreciated that further variations and modifications may be made thereto without departing from the scope of the invention as defined in the appended claims.

I claim:

1. A two-panel reflective liquid crystal display projection system comprising:
   a screen adapted for displaying red, blue and green light;
   a polarized light beam splitter;
   a first liquid crystal display panel that receives light from said polarized light beam splitter and which provides a sequence of red, blue and green light to said screen; and
   a second liquid crystal display panel that receives light from said polarized light beam splitter and which provides a sequence of red, blue and green light to said screen,
   wherein said sequence provided by said second liquid crystal display panel is provided simultaneous to and staggered with respect to said sequence provided by said first liquid crystal display panel, such that at least two colors of red, blue and green light are simultaneously displayed on said screen; and
   wherein said first liquid crystal display panel provides a sequence of green light for two thirds of a frame time, then provides blue light for two thirds of a frame time, and then provides red light for two thirds of a frame time, and wherein said second liquid crystal display panel simultaneously provides a secuence of blue light for one third of a frame time, then provides red light for two thirds of a frame time, then provides green light for two thirds of a frame time, and then provides blue light for one third of a frame time, such that at least two of said red, blue and green light is projected on said screen at a time.

2. The system of claim 1 further comprising:
   a light source that provides red, green and blue light; and
   a color switch adapted for rotating an orientation of red, blue and green light incident thereon from said light source and passing said light to said polarized light beam splitter.

3. The system of claim 1 further comprising:
   a color switch adapted for rotating an orientation of red, blue and green light incident thereon from said polarized light beam splitter and passing said light to said screen.

4. The system of claim 1 wherein light projected on said screen comprises two color artifacts per frame time.

5. The system of claim 2 wherein said light source provides S-oriented red, blue and green light, said polarized light beam splitter re-directs S-oriented light and passes P-oriented light from said color switch, and wherein said polarized light beam splitter re-directs S-oriented light and passes P-oriented light provided from said first and second liquid crystal display panels.

6. The system of claim 2 further comprising:
   a polarizer positioned between said light source and said color switch; and
   an analyzer positioned between said polarized beam splitter and said screen.

7. The system of claim 2 wherein said color switch passes light unrotated when said switch is powered, and wherein said color switch changes a rotation of light passing therethrough when said switch is unpowered.

8. The system of claim 7 wherein said color switch transitions from rotating to non-rotating operation in 20 μsec.

9. The system of claim 1 wherein said first liquid crystal display panel provides said sequence of red, blue and green light to said screen through said polarized light beam splitter, and wherein said second liquid crystal display panel provides said sequence of red, blue and green light to said screen through said polarized light beam splitter.

10. A two-panel reflective liquid crystal display projection system comprising:
    a light source that provides light having a plurality of color bands and a predetermined orientation;
    a polarized light beam splitter adapted for passing light having a first predetermined orientation, and adapted for re-directing light having a second predetermined orientation;
    a first color switch positioned between said light source and said polarized light beam splitter, said first color switch adapted for changing an orientation of a color band of light provided by said light source;
    a first liquid crystal display panel positioned to receive said light re-directed by said polarized light beam splitter, said first liquid crystal display panel adapted for rotating an orientation of a color band of light received from said polarized light beam splitter;
    a second liquid crystal display panel positioned to receive said light passed by said polarized light beam splitter, said second liquid crystal display panel adapted for rotating an orientation of a color band of light received from said polarized light beam splitter; and
    a second color switch adapted for rotating an orientation of a color band of light incident on said second color switch, wherein said second color switch is positioned to receive light provided simultaneously from said first and second liquid crystal display panels.

11. The system of claim 10 further comprising a screen that simultaneously shows at least two color bands of light received from said second color switch.

12. The system of claim 10 wherein said light source simultaneously provides color bands chosen from the group consisting of green light, red light, and blue light.

13. The system of claim 10 wherein said first and second liquid crystal display panels simultaneously each reflect different ones of said color bands of light.

14. The system of claim 10 wherein said first color switch rotates an orientation of one of said color bands of light passing there through, and wherein said second color switch simultaneously rotates an orientation of two of said color bands of light passing there through.

15. The system of claim 10 wherein said second color switch receives light from said first and second liquid crystal display panels through said polarized light beam splitter.

16. A method of providing an image having at least two colors simultaneously projected at a given time, comprising the step of:
providing to a first color switch, light having at least three color bands, each color band having an orientation;
operating said first color switch to rotate said orientation of at least one of said color bands;
providing a beam splitter for receiving light from said first color switch, said beam splitter passing light having a first orientation and redirecting light having a second orientation;
providing a first liquid crystal display panel for receiving light passed by said beam splitter, and operating said first liquid crystal display panel to rotate an orientation of a color band received by said first liquid crystal display panel;
providing a second liquid crystal display panel for receiving light redirected by said beam splitter, and operating said second liquid crystal display panel to rotate an orientation of a color band received by said second liquid crystal display panel; and
providing a second color switch for receiving light from said first and second liquid crystal display panels, and operating said second color switch to rotate said orientation of a color band received by said second color switch.

17. The method of claim 16 further comprising providing a screen, and providing said screen simultaneously with at least two color bands of light from said second color switch.

18. The method of claim 16 further comprising the step of operating said first color switch to rotate said orientation of a different one of said at least one of said color bands.

19. The method of claim 16 comprising the steps of operating said first and second color switches in the sequence shown in FIG. 3.

20. A two-panel reflective liquid crystal display projection system comprising:
a screen adapted for displaying red, blue and green light;
a polarized light beam splitter
a first liquid crystal display panel that receives light from said polarized light beam splitter and which provides a sequence of red, blue and green light to said screen;
a second liquid crystal display panel that receives light from said polarized light beam splitter and which provides a sequence of red, blue and green light to said screen;
wherein said sequence provided by said second liquid crystal display panel is provided simultaneous to and staggered with respect to said sequence provided by said first liquid crystal display panel, such that at least two colors of red, blue and green light are simultaneously displayed on said screen;
a light source that provides red, green and blue light;
a color switch adapted for rotating an orientation of red, blue and green light incident thereon from said light source and passing said light to said polarized light beam splitter;
a polarizer positioned between said light source and said color switch; and
an analyzer positioned between said polarized beam splitter and said screen.

21. A two-panel reflective liquid crystal display projection system comprising:
a screen adapted for displaying red, blue and green light;
a polarized light beam splitter;
a first liquid crystal display panel that receives light from said polarized light beam splitter and which provides a sequence of red, blue and green light to said screen;
a second liquid crystal display panel that receives light from said polarized light beam splitter and which provides a sequence of red, blue and green light to said screen;
wherein said sequence provided by said second liquid crystal display panel is provided simultaneous to and staggered with respect to said sequence provided by said first liquid crystal display panel, such that at least two colors of red, blue and green light are simultaneously displayed on said screen;
a light source that provides red, green and blue light;
a color switch adapted for rotating an orientation of red, blue and green light incident thereon from said light source and passing said light to said polarized light beam splitter; and
wherein said color switch passes light unrotated when said switch is powered, and wherein said color switch changes a rotation of light passing therethrough when said switch is unpowered.

22. A two-panel reflective liquid crystal display projection system comprising:
a screen adapted for displaying red, blue and green light;
a polarized light beam splitter;
a first liquid crystal display panel that receives light from said polarized light bean splitter and which provides a sequence of red, blue and green light to said screen;
a second liquid crystal display panel that receives light from said polarized light beam splitter and which provides a sequence of red, blue and green light to said screen;
wherein said sequence provided by said second liquid crystal display panel is provided simultaneous to and staggered with respect to said sequence provided by said first liquid crystal display panel, such that at least two colors of red, blue and green light are simultaneously displayed on said screen; and
wherein said first liquid crystal display panel provides said sequence of red, blue and green light to said screen through said polarized light beam splitter, and wherein said second liquid crystal display panel provides said sequence of red, blue and green light to said screen through said polarized light beam splitter.

* * * * *